C. ADAMS.
DIRIGIBLE HEAD LAMPS FOR VEHICLES.
APPLICATION FILED AUG. 8, 1914.
1,134,089.
Patented Apr. 6, 1915.
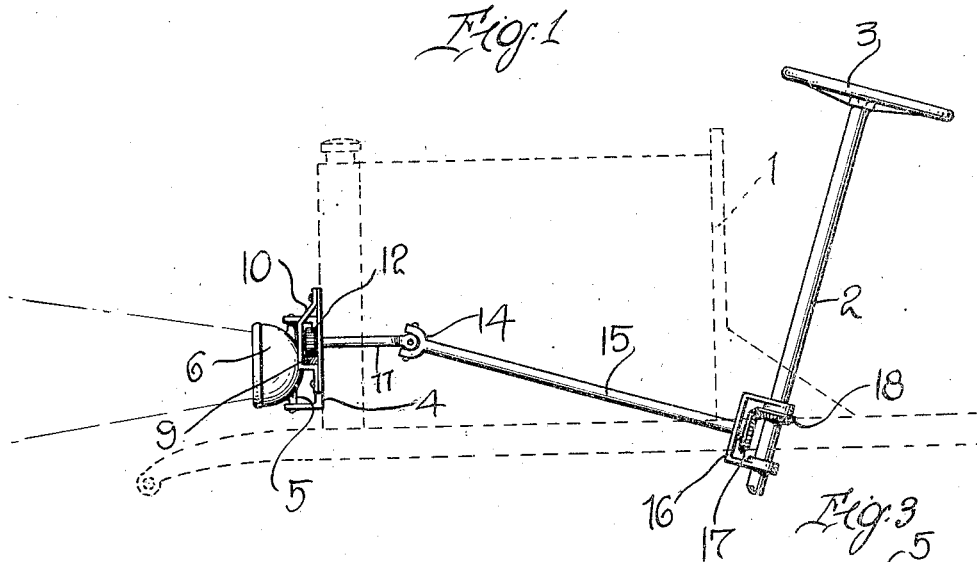
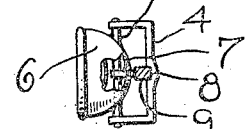
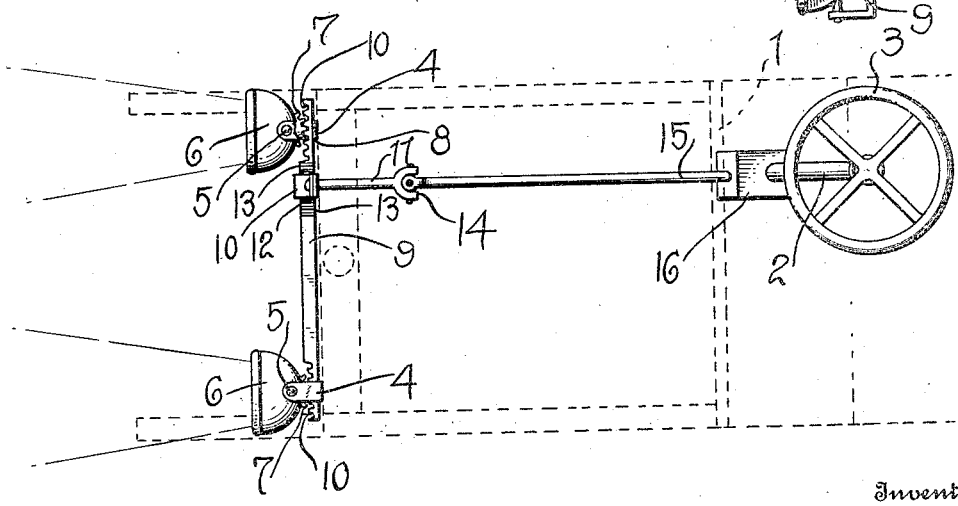
Inventor
C. Adams
Witnesses

UNITED STATES PATENT OFFICE.

CHARLES ADAMS, OF HOLSTEIN, IOWA, ASSIGNOR OF ONE-HALF TO PETER J. A. SCHNOOR, OF HOLSTEIN, IOWA.

DIRIGIBLE HEAD-LAMPS FOR VEHICLES.

1,134,089.  Specification of Letters Patent.  Patented Apr. 6, 1915.

Application filed August 8, 1914. Serial No. 855,827.

*To all whom it may concern:*

Be it known that I, CHARLES ADAMS, a citizen of the United States, residing at Holstein, in the county of Ida and State of Iowa, have invented certain new and useful Improvements in Dirigible Head-Lamps for Vehicles, of which the following is a specification, reference being had to the accompanying drawings.

This invention relates to new and useful improvements in dirigible head lamps for vehicles, and an object thereof is the provision of a simple and efficient means for automatically turning the head lamps of a vehicle when the steering wheel is turned, to always have the rays of the lamps disposed in the path of the vehicle whether the same is proceeding in a straight line, or rounding a curve.

Another object of this invention is the provision of dirigible head lamps which are turned simultaneously with the steering wheels of the vehicle, the lamps being operatively connected with the steering post, so that the lamps may be turned without any lost motion.

With these and other objects in view, my invention consists in the novel construction, combination, and arrangement of parts to be hereinafter more fully described, claimed, and illustrated in the accompanying drawing, in which—

Figure 1 is a side elevational view of my improved device; Fig. 2 is a top plan view thereof; and Fig. 3 is a detail sectional view showing the manner of operatively connecting one of the lamp supporting posts with the transverse operating shaft.

Referring more particularly to the drawing, the numeral 1 designates a portion of the frame of an automobile or similar vehicle, and 2 the rotatable steering post to the upper end of which the steering wheel 3 is connected. Secured to the frame of the vehicle are vertical brackets 4, in which vertical posts 5 are rotatably mounted to which the lamps 6 are connected, and secured to each post 5 intermediate of its ends is a segmental gear 7. Formed in the brackets 4 in transverse alinement with the gears 7 are recesses 8 to provide seats to receive the ends of a horizontal bar 9, which is provided at its ends on one face thereof with teeth 10 which mesh with the teeth of the gears 7.

Connected to the frame between the lamps, is a U-shaped bracket 10 which is disposed vertically, and mounted at one end in the bracket intermediate of its ends and in its other end in the frame is a rotatable shaft 11 upon which a gear wheel 12 is keyed, the bar 9 extending through the bracket below the gear wheel 12, and the bar having a series of teeth 13 upon its upper face which mesh with the teeth of the gear wheel 12. Connected by a knuckle 14 to the inner end of the shaft 11, is an operating shaft 15, the inner end of which is rotatably mounted in a bracket 16 connected to the steering post 2, and mounted on the inner extremity of the shaft 15 within the bracket is a pinion 17 which meshes with the pinion 18 keyed upon the steering post 2.

In the practical use of my improved device, the parts thereof are connected so that the lamps are disposed to throw their rays directly in front of the vehicle when the steering wheels are arranged in a straight line, so that upon rotation of the steering post, the lamps will be rotated to point in the same direction as the wheels. Upon rotation of the steering post 2 by the manipulation of the steering wheel 3, the shafts 11 and 15 are rotated by reason of the meshing of the pinion 17 on the shaft 15 and the pinion 18 on the post, the gear wheel 12 carried by the shaft 11 serving to slide the bar 9 transversely of the vehicle by reason of the engagement of the teeth of the gear wheel with the teeth 13 on the bar. It will be seen that the lamps 6 are simultaneously rotated as the bar 9 is moved from one side to the other by reason of the meshing of the teeth 10 on the ends of the bar with the gears 7 on the posts which carry the lamps, and as the lamps are operatively connected directly with the steering post, it will be seen that upon a slight turning of the steering post the lamps will also be turned, as no lost motion is possible owing to loose connections, as frequently occur in dirigible lamps which are operatively connected to the stub axles of the vehicle.

Having thus fully described my invention, what I desire to claim and secure by Letters Patent is:—

1. A device of the class described including the frame of a vehicle, U-shaped brackets supported upon opposite sides thereof at its front end, vertical posts rotatably mounted within said brackets, lamps carried by said posts, segmental gears formed upon the intermediate portions of the posts, a U-shaped bracket supported by the frame, a bar movable through the bracket, rack teeth at each end of the bar adapted to engage the segmental gears, a shaft rotatably mounted within said bracket, a gear wheel carried thereby, and teeth formed upon the upper face of the bar adapted for engagement with the gear wheel whereby upon rotation of the shaft, the bar will be reciprocated to rotate the lamps.

2. A device of the class described including the frame of a vehicle, U-shaped brackets supported upon opposite sides thereof at its front end, vertical posts rotatably mounted within said brackets, lamps carried by said posts, segmental gears formed upon the intermediate portions of the posts, a U-shaped bracket supported by the frame, a bar movable through the bracket, rack teeth at each end of the bar adapted to engage the segmental gears, a shaft rotatably mounted within said bracket, a gear wheel carried thereby, teeth formed upon the upper face of the bar adapted for engagement with the gear wheel, and means connected with said shaft whereby to rotate the same and impart reciprocating movement to the bar to rotate said lamps, as and for the purpose set forth.

In testimony whereof I hereunto affix my signature in the presence of two witnesses.

CHARLES ADAMS.

Witnesses:
PETER J. A. SCHNOOR,
ALBERT G. MERKLEY.